United States Patent
Cavalli et al.

(10) Patent No.: US 11,473,637 B2
(45) Date of Patent: *Oct. 18, 2022

(54) PREFORM FOR MAKING A COMPONENT OF A BRAKING SYSTEM

(71) Applicant: FRENI BREMBO S.P.A., Curno (IT)

(72) Inventors: Lorenzo Cavalli, Curno (IT); Luca Menapace, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 77 days.

This patent is subject to a terminal disclaimer.

(21) Appl. No.: 16/636,061

(22) PCT Filed: Jul. 31, 2018

(86) PCT No.: PCT/IB2018/055722
§ 371 (c)(1),
(2) Date: Feb. 3, 2020

(87) PCT Pub. No.: WO2019/025966
PCT Pub. Date: Feb. 7, 2019

(65) Prior Publication Data
US 2020/0207667 A1      Jul. 2, 2020

(30) Foreign Application Priority Data

Aug. 3, 2017   (IT) .................. 102017000089398

(51) Int. Cl.
*F16D 69/02*    (2006.01)
*C04B 35/626*   (2006.01)
*C04B 35/634*   (2006.01)

(52) U.S. Cl.
CPC ........ *F16D 69/026* (2013.01); *C04B 35/6267* (2013.01); *C04B 35/6268* (2013.01);
(Continued)

(58) Field of Classification Search
CPC ..... Y10T 428/24785; Y10T 428/24802; Y10T 428/249928; Y10T 428/249953;
(Continued)

(56) References Cited

U.S. PATENT DOCUMENTS 5,962,067 A    10/1999   Bautista et al.
6,251,486 B1    6/2001   Chandross et al.
(Continued)

FOREIGN PATENT DOCUMENTS

| EP | 0902067 A1 | 3/1999 |
|---|---|---|
| WO | WO/2006115755 A2 | 11/2006 |
| WO | WO/2008141201 A1 | 11/2008 |

OTHER PUBLICATIONS

European Patent Office, International Search Report and Written Opinion, issued in PCt/IB2018/055722, dated Oct. 19, 2018, 11 pages, European Patent Office, Rijswijk, Netherlands.

*Primary Examiner* — Camie S Thompson
(74) *Attorney, Agent, or Firm* — Marshall & Melhorn, LLC (57) ABSTRACT

A preform for making a component of a braking system having a fibre-reinforced ceramic composite material, obtained by forming and subsequent pyrolysis of a pre-preg is described. Also described is a component of a braking system made wholly or in part from the preform, and a method for making a preform in a fibre-reinforced ceramic composite material.

24 Claims, 1 Drawing Sheet

(52) U.S. Cl.
CPC ............................. *C04B 35/63448* (2013.01);
*C04B 2235/3826* (2013.01); *C04B 2235/421*
(2013.01); *C04B 2235/425* (2013.01); *C04B*
*2235/483* (2013.01); *C04B 2235/5204*
(2013.01); *C04B 2235/604* (2013.01); *F16D*
*2200/0047* (2013.01)

(58) Field of Classification Search
CPC .. C08L 83/04; C08K 3/36; C08K 3/38; C08G
77/04; C08G 77/60; C09D 183/04; F16D
2200/0047; F16D 69/026; F16D 69/02;
C04B 2235/483; C04B 2235/3826; C04B
2235/5428; C04B 2235/5244; C04B
35/6264; C04B 35/6267; C04B 35/76;
C04B 35/80; C04B 35/6269; C04B
35/522; C04B 14/303; C04B 2235/421;
C04B 2235/425; C04B 2235/5204; C04B
2235/604; C04B 35/6268; C04B 35/634

USPC ...... 428/193, 195.1, 391, 293.4, 304.4, 323;
442/140, 179, 59, 266, 4; 427/294, 387;
264/101, 29.5; 556/431, 433, 458;
106/287.12, 287.13, 287.16; 188/218 XL;
528/10, 31, 33, 43; 524/500, 701
See application file for complete search history.

(56) References Cited

U.S. PATENT DOCUMENTS

| | | |
|---|---|---|
| 2006/0004169 A1 | 1/2006 | Sherwood et al. |
| 2006/0244165 A1 | 11/2006 | Huang |
| 2008/0093185 A1 | 4/2008 | Sherwood, Jr. et al. |
| 2008/0095942 A1 | 4/2008 | Sherwood, Jr. et al. |
| 2020/0207668 A1* | 7/2020 | Cavalli ............... C04B 35/6269 |

* cited by examiner

PREFORM FOR MAKING A COMPONENT OF A BRAKING SYSTEM

JOINT RESEARCH STATEMENT

The present application is the subject of a joint research agreement between the applicant, Freni Brembo S.P.A., and Petroceramics S.P.A.

FIELD OF APPLICATION

A preform for making a component of a braking system, consisting of a fibre-reinforced ceramic composite material, obtained by forming and pyrolysis of a pre-preg, forms the subject of the present invention.

The preform according to the present invention finds particular application in the production of components designed to operate at elevated temperatures (higher than 400° C.), such as, for example, components of disc brakes (like braking bands, bells, brake calipers) or parts of engines. In particular, the preform according to the invention is designed to undergo processes of densification for making, in particular, components of disc brakes or parts of engines.

STATE OF THE ART

As is known, in jargon, a fibre-reinforced composite material pre-impregnated with a polymeric binder composition is simply called a "pre-preg".

A pre-preg consists of fibres, generally carbon fibres and/or glass fibres and/or ceramic fibres, arranged so as to form a woven or unwoven fabric, and impregnated with a thermosetting or thermoplastic polymeric composition. During any forming process, the polymeric composition, impregnating the fibres, forms a binding matrix, which fixes the fibres to one another.

The thermoplastic matrices are processed by means of heating at temperatures higher than the glass transition temperature typical of the material. This allows the polymeric chains to move and slide on one another until the temperature is brought back to below the glass transition temperature (Tg), in a reversible process.

In the case of the thermosetting matrices, the processes are carried out before creating a quantity of chemical bonds between adjacent chains (cross-linking or curing), which is such that it prevents the relative movement thereof, causing the polymer to harden in a non-reversible process.

In the production of pre-pregs, the thermosetting polymeric compositions used are based on organic resins, generally epoxy or phenolic or vinyl ester- or cyanate ester-based resins. For these purposes, within these families of resins, resins are used with such rheological characteristics (in particular viscosity) as to allow the desired level of integration/impregnation to be obtained between fibres and resin during the impregnation phase.

In the production of pre-pregs, the thermoplastic polymeric binder compositions used are, for example, polyether ether ketone (PEEK), polyether imide (PEI) and poly paraphenylene sulfide (PPS).

During the production of the pre-preg, the thermosetting polymeric matrix is not cross-linked, or it is only partially cross-linked, so as to make the pre-preg manipulable, but still workable. For this purpose, the pre-preg is kept at low temperatures to prevent the cross-linking from completing.

Operatively, the production process of a pre-preg comprises an impregnation step, wherein the fibres are arranged on flat surfaces and are impregnated in such configuration with the polymeric composition. During such step the partial cross-linking of the thermosetting polymeric composition may occur at varying temperatures in the prior art, depending on the polymeric composition used. The material is then cooled at room temperature. The pre-preg is thus available in the form of flat workable sheets, which can then be processed to obtain components with extremely complex shapes, for example, for stratification or rolling and subsequent shaping operations.

The organic resins give the pre-preg optimum characteristics of mechanical resistance even after partial cross-linking.

However, pre-pregs made with organic resins present a series of limits, which condition the characteristics of the materials obtained therefrom, or which make them unusable for certain applications.

For example, after pyrolysis, the organic resins form a carbonaceous residue, which, in the case of epoxy resins, is also extremely limited and insufficient to ensure a good consistency of the composites. Such carbonaceous residue is also not suitable for applications at high temperatures in an oxidising environment and has insufficient hardness to ensure good resistance to abrasion.

For example, the low yield of the epoxy resins after pyrolysis makes the epoxy-resin based pre-pregs unsuitable for creating preforms for densification processes.

In particular, a traditional organic resin based pre-preg can exhibit the following limits:
 low operating temperature of the composites obtained after complete cross-linking of the resins; despite having excellent characteristics of mechanical resistance, such composites can unlikely work above 200° C. in an oxidising environment;
 low resistance to wear by mechanical abrasion, due to the presence of carbonaceous matrices in the composites obtained;
 impossibility to generate inorganic amorphous and/or crystalline structures after pyrolysis;
 low thermal conductivity of the composite, which makes it unsuitable for applications requiring an elevated capacity for heat dissipation, such as, for example, the production of disc brake components.

Thus, there is a need to produce fibre-reinforced ceramic composite materials obtained from a pre-preg after forming and pyrolysis, with inorganic amorphous and/or crystalline structures, which are such that they make the composite materials thus obtained:
 characterised by elevated thermal conductivity;
 suitable for producing preforms for densification processes;
 characterised by greater hardness so as to ensure an increased resistance to abrasion.

To date, such needs have not been met due to the fact that alternative resins potentially capable of meeting the aforesaid technical requirements, such as, for example, pre ceramic silicon-organic resins (siloxane resins, silazane resins, etc.), nonetheless have such rheological characteristics as to make them unsuitable for the impregnation of fibrous masses using standard pre-preg manufacturing technologies.

PRESENTATION OF THE INVENTION

Therefore, it is an object of the present invention to eliminate, or at least reduce, the aforesaid problems related to the prior art, providing a preform for making a component of a braking system, consisting of a fibre-reinforced ceramic composite material obtained from a pre-preg after forming and pyrolysis, with inorganic amorphous and/or crystalline structures, which are such as to make it suitable for making components designed to operate at elevated temperatures.

In particular, it is an object of the present invention to provide a preform for making a component of a braking system, consisting of a fibre-reinforced ceramic composite material obtained from a pre-preg after forming and pyrolysis, which has inorganic amorphous and/or crystalline structures, which are such that they make it suitable for making preforms for densification processes, and which has elevated thermal conductivity and greater hardness so as to ensure increased resistance to abrasion.

DESCRIPTION OF THE DRAWINGS

The technical features of the invention can clearly be seen from the content of the claims appended below and the advantages of the same will become more apparent from the following detailed description, made with reference to the appended drawings, representing one or more embodiments thereof illustrated purely by way of a non-limiting example, wherein:

DETAILED DESCRIPTION

The present invention relates to a preform for making a component of a braking system, consisting of a fibre-reinforced ceramic composite material, obtained by forming and pyrolysis of a pre-preg.

In general, by "fibre-reinforced ceramic composite material" it is meant a material with a ceramic or partially ceramic matrix inside which reinforcement fibres are arranged.

By the term "ceramic matrix" it is meant the matrix obtained from pyrolysis of siloxane and/or silsesquioxane resins, which belong to the family of pre ceramic resins. The partial or complete ceramization of the matrix can be obtained by adjusting the pyrolysis temperature. Pyrolysis treatments at a low temperature (400-900° C.) allow a partially pyrolised pyrolysis residue to be obtained, still rich in organic structures. Pyrolysis at higher temperatures results in the complete ceramization of the pyrolysis residue, which can form inorganic amorphous or crystalline structures (the latter at pyrolysis temperatures in excess of about 1300° C.).

The composition of the ceramic or partially ceramic matrix depends on the type of ceramic precursors used to make the material.

As said in the description below, in the specific case, the ceramic precursors used are polysiloxanes or polysilsesquioxanes. The ceramic or partially ceramic matrix comprises silicon oxycarbides (SiOC) and/or silicon carbide (SiC). In particular, the silicon oxycarbides (SiOC) can form amorphous structures constituted of Si—O—C chains of different lengths.

According to the invention, the pre-preg from which the fibre-reinforced ceramic composite material is obtained by forming and pyrolysis, which constitutes the preform, comprises a fibrous mass impregnated with a polymeric binder composition based on one or more resins selected from the group consisting of siloxane resins and silsesquioxane resins.

The expression "based on . . . " means that the resins selected from the group consisting of siloxane resins and silsesquioxane resins constitute at least 70% by weight of the polymeric binder composition.

Optionally, the aforesaid polymeric binder composition can comprise organic resins, preferably epoxy resins, phenolic resins and/or vinyl ester- or cyanate ester-based resins. However, organic resins, if present, constitute no more than 30% by weight of the polymeric binder composition.

Preferably, the aforesaid polymeric binder composition comprises only resins selected from the group consisting of siloxane resins and silsesquioxane resins, and does not comprise organic resins.

Siloxane resins are polymeric resins, which comprise polysiloxanes or which are based on polysiloxanes, whereas siloxane resins are polymeric resins which comprise polysilsesquioxanes or which are based on polysilsesquioxanes.

As is known, polysiloxanes and polysilsesquioxanes are compounds characterised by the presence of silicon-oxygen bonds in the main chain. Polysiloxanes have the following basic structure whereas polysilsesquioxanes have the following basic structure According to the invention, the polymeric binder composition with which the fibrous mass of the aforesaid pre-preg is impregnated appears as a liquid, having viscosity from 55000 to 10000 mPa·s at temperatures from 50° C. to 70° C.

Such rheological characteristics make the aforesaid polymeric binder composition adapted to the impregnation of fibrous masses in the process of making a pre-preg, overcoming the limits which have so far prevented the use of siloxane resins and/or silsesquioxane resins in the production of pre-pregs.

The fibre-reinforced ceramic composite material according to the invention comprises a ceramic or partially ceramic matrix, which develops itself in the interstices of the fibrous mass and comprises silicon carbide and amorphous structures consisting of Si—O—C chains. The silicon carbide and Si—O—C chains have been generated by the pyrolysis process on the polysiloxanes and/or on the polysilsesquioxanes. The pyrolised and fibre-reinforced ceramic composite material according to the invention has a porosity generated by pyrolysis on the polymeric binder composition of the pre-preg.

In the following part of the description, for the sake of simplicity, the term "ceramic matrix" will be used instead of the term "ceramic or partially ceramic matrix".

Thus, the pre-preg used according to the invention differs from a traditional pre-preg in that it is not impregnated or, at least, it is not impregnated exclusively with organic resins (in particular, phenolic or epoxy resins, or vinyl ester- or cyanate ester-based resins), but it is impregnated with a polymeric binder composition based on one or more resins selected from the group consisting of siloxane resins and silsesquioxane resins.

Siloxane resins and silsesquioxane resins have different characteristics with respect to organic resins (mainly epoxy) normally used to make pre-pregs, in particular pre-pregs based on carbon fibres or ceramic or glass fibres.

Firstly, siloxane and silsesquioxane resins show a far greater stability in temperature, due to the reduced loss of weight thereof, both in an oxidising environment and in an inert atmosphere.

A second particular characteristic of siloxane and silsesquioxane resins is the ability to form amorphous structures after pyrolysis at temperatures from 400 to 900° C., consisting of Si—O—C chains. Such structures can be crystallised by means of heat treatments at higher temperatures, about 1300-1500° C. In this way, starting from the resins, it is possible to form silicon carbide, a composite with properties of technological interest, such as: very high hardness, high modulus of elasticity, high melting temperature and thermal stability, high thermal conductivity.

Instead, after pyrolysis, organic resins form a carbonaceous residue, which, in the case of epoxy resins, is also extremely limited and insufficient to ensure a good consistency of the composites. Such carbonaceous residue is also not suitable for applications at high temperatures in an oxidising environment and has insufficient hardness to ensure a good resistance to abrasion.

For this reason, as said previously, preferably, according to the invention, the polymeric binder composition does not contain organic resins. In any case, the content of organic resins does not exceed 30% by weight of the polymeric binder composition, so as to limit the negative effect produced by the presence of the organic resins.

Given the reduced weight loss after pyrolysis and the possibility of forming silicon carbide, siloxane or silsesquioxane resins are suitable for making preforms to be densified. By the term densification, it is meant processes such as: polymer impregnation and pyrolysis (PIP) or liquid silicon infiltration (LSI).

As will be described further on, the characteristics exhibited by the fibre-reinforced ceramic composite material obtained from a pre-preg according to the invention after forming and pyrolysis and optionally densification are:
medium mechanical characteristics (Stress at break up to about 300-350 MPa, value influenced by many factors, including fibres and types and levels of densification);
Thermal conductivity (>1 W/(m·° K));
Good resistance to wear by abrasion;
Operating temperature up to 1000° C., nonetheless variable depending on the densification processes.

Applications for which composites obtained in this way can be of interest include components of disc brakes (such as braking bands, bells, brake caliper bodies) or parts of engines.

The advantages described above are apparent if the preform undergoes a densification process using PIP techniques. In fact, the use of resins containing silicon is the only way to generate silicon carbide in matrix directly in the preform. This would not be possible in any way if the preform were produced from a pre-preg based exclusively on organic resins. This aspect allows composites to be made using PIP techniques, with a significantly higher content of silicon carbide in matrix compared to composites obtained by applying the same techniques to carbonaceous preforms obtained exclusively from organic resins.

Instead, such advantages are less apparent in the case of densification using LSI technique. In fact, it should be noted that infiltration with silicon allows a large quantity of silicon carbide to be formed in matrix, also starting from an organic-based pre-preg (such as, for example, a phenolic pre-preg).

Advantageously, the pre-preg from which—by forming and pyrolysis—it is obtained the fibre-reinforced ceramic composite material, which constitutes the preform according to the invention, can be made by following the production process for a traditional pre-preg, except for the type of polymeric binder composition used.

More specifically, in particular, the process for the production of the aforesaid pre-preg comprises the following operating steps:
arranging the fibrous mass in laminar form;
impregnation step, in particular at temperatures from 60° to 100° C., during which the impregnation of the fibrous mass takes place with the polymeric binder composition and eventually partial cross-linking of the polymeric binder composition itself; and
cooling of the material thus obtained at room temperature.

In particular, the application of the polymeric binder composition on the fibrous mass can be obtained by depositing the polymeric composition on a transfer support beforehand (for example paper). The presence of the transfer support facilitates the deposition of the polymeric binder composition on the fibrous mass. The deposition of the polymeric composition on the transfer support is carried out in a so-called film casting step of the polymeric binder composition.

Alternatively, the polymeric binder composition can be applied directly to the fibrous mass.

In the pre-preg thus obtained, as with traditional pre-pregs, the polymeric binder composition forms a binding matrix, which is not cross-linked, or only partially cross-linked (or hardened), which fills the interstices of the fibrous mass. In this way, the pre-preg is manipulable on the one hand and flexible on the other. In fact, the solidification of the polymeric binder composition in the pre-preg would result in the stiffening thereof and consequent loss of workability characteristics.

In particular, the pre-preg thus obtained can be made in the form of flat workable sheets, which are then processed to obtain components with extremely complex shapes, for example, for stratification or rolling and subsequent shaping operations. Such components then undergo further treatments (complete cross-linking, pyrolysis, densification) to obtain end products with particular characteristics.

According to a preferred embodiment, the ceramic matrix constitutes from 15% to 70% by weight of the fibre-reinforced ceramic composite material, whereas the fibrous mass constitutes from 30% to 85% by weight of such material.

The content of fibres and ceramic matrix can be varied according to the characteristics intended to be obtained in the fibre-reinforced composite material according to the invention.

A material with a high fibre content is more suitable for applications requiring high mechanical characteristics. Instead, an increased percentage of ceramic matrix may be more suitable for applications requiring higher operating temperatures or resistance to mechanical wear.

In particular, the fibrous mass can be constituted of fibres selected from the group consisting of carbon fibres, glass fibres, ceramic fibres or a mixture thereof. In particular, the carbon fibres are carbon fibres from polyacrylonitrile (PAN) and/or carbon fibres from pitch, whereas glass fibres or ceramic fibres are constituted of alumina, zirconia or silicon carbide.

According to a preferred embodiment, the fibrous mass only consists of carbon fibres, PAN or pitch.

Preferably, the fibrous mass consists of continuous fibres, which form one or more layers of fabric or non-woven fabric.

Alternatively, the fibrous mass can be constituted of chopped fibres dispersed in the solid binding polymeric matrix.

Advantageously, the aforesaid ceramic matrix can comprise a thermoconductive inert filler in the form of powder, preferably selected from the group consisting of boron nitride or high crystallinity graphites or metals or a combination thereof.

Preferably, the aforesaid thermoconductive inert filler constitutes from 10% to 30% by volume of the pre-impregnated fibre-reinforced ceramic composite material.

The presence of a thermoconductive inert filler in the ceramic matrix is particularly advantageous if the fibre-reinforced ceramic composite material is intended for applications in which elevated thermal conductivity is essential, for example, components of disc brakes (such as braking bands, bells, brake caliper bodies) or parts of engines.

According to a preferred embodiment, the aforesaid polymeric binder composition with which the pre-preg is impregnated comprises a mixture of:
  at least one resin selected from the group consisting of siloxane resins and silsesquioxane resins, solid at room temperature, with a melting point ranging from 40° C. to 90° C.; and
  at least one resin selected from the group consisting of siloxane resins and silsesquioxane resins, liquid at room temperature, with viscosity at room temperature from 1 mPa·s to 5000 mPa·s.

In general, the weight ratio between solid resin at room temperature and liquid resin at room temperature is selected so that the polymeric binder composition obtained from the mixture of the two resins appears as a liquid with a viscosity from 55,000 to 10,000 mPa·s at temperatures from 50° C. to 70° C.

Preferably, the weight ratio between solid resin at room temperature and liquid resin at room temperature is from 100/30 to 100/50.

Advantageously, the aforesaid polymeric binder composition can consist entirely of the aforesaid mixture of solid resin and liquid resin at room temperature.

Preferably, the solid resin at room temperature is selected from the group consisting of phenyl siloxane resin, methyl siloxane resin, phenyl methyl silsesquioxane resin, methyl silsesquioxane resin and said liquid resin at room temperature is selected from the group consisting of methyl methoxy siloxane resin and methyl phenyl vinyl siloxane resin.

Preferably, the solid resin at room temperature is selected from the group consisting of: a phenyl siloxane resin (for example, commercial products Silres 601 or RSN-0217), methyl siloxane, phenyl methyl silsesquioxane (for example, commercial product Silres H44), methyl silsesquioxane (for example, commercial product Silres MK).

Preferably, the liquid resin at room temperature is selected from the group consisting of: a methyl methoxy siloxane resin (for example, commercial product Silres MSE100) and methyl phenyl vinyl siloxane (for example, commercial product Silres H62C).

Advantageously, the liquid resin can be selected from the liquid siloxane resins without solvent or with a solvent content of less than 2% by weight.

According to a preferred embodiment of the invention, the solid resin is a phenyl siloxane resin, whereas the liquid resin is a methyl methoxy siloxane resin.

According to an alternative embodiment, the aforesaid polymeric binder composition with which the pre-preg is impregnated, can comprise a mixture of:
  a single resin selected from the group consisting of siloxane resins and silsesquioxane resins, liquid at room temperature, with viscosity at room temperature from 1 mPa·s to 5000 mPa·s;
  an inert filler in powder, adapted to give the polymeric binder composition the rheological characteristics needed to allow the impregnation of the fibrous mass.

In particular, the inert filler in powder is introduced to increase the viscosity of the liquid resin at room temperature.

In general, the volume ratio between inert filler in powder and liquid polymer at room temperature is selected so that the polymeric binder composition obtained from the mixture thereof appears as a liquid with viscosity from 55,000 to 10,000 mPa·s at temperatures from 50° C. to 70° C.

Preferably, the volume ratio between inert filler in powder and liquid polymer at room temperature is from 10/100 to 40/100.

Preferably, the polymeric binder composition with which the pre-preg is impregnated can further comprise at least one solvent, selected from the compounds able to solubilize the polysiloxanes and the polysilsesquioxanes.

The solvent serves to preserve the rheological characteristics of the resin over time, consequently making the pre-preg manipulable for longer and able to be processed more easily and kept for longer.

Preferably, the aforesaid solvent is divinylbenzene, which has the advantage of having a low vapour pressure (tending to evaporate less) and not being inflammable, unlike other solvents usable for this object, such as, for example toluene or acetone.

Preferably, the solvent (if present) constitutes less than 1% by weight of the pre-impregnated fibre-reinforced ceramic composite material.

Advantageously, the polymeric binder composition can further comprise at least one catalyst adapted to favour the cross-linking of the polymers (polysiloxanes and/or polysilsesquioxanes) of the polymeric composition at temperatures higher than 100° C.

The presence of the catalyst serves to make the processes more suitable for industrial production as they reduce the times and temperatures needed to form the pieces.

In particular, the catalyst can be inserted directly into the polymeric binder composition or it can be added to the polymeric binder composition during the preparation of the pre-preg, at a temperature of less than 100° C., so that, during these steps, it remains latent and doesn't generate the cross-linking of the polymeric binder composition. Thus, the catalyst must carry out its function at the temperatures at which the composite is subsequently formed (e.g. 150-180° C.).

Preferably, the catalyst is selected from the group consisting of titanates, metal octoates and amines or a combination thereof.

Even more preferably, the catalyst is selected from the group consisting of: titanium tetrabutanolate (for example, supplied by Wacker with the commercial name "Catalyst TC44"); zinc octoate; and N-3-(trimethoxysilyl) propyl)

ethylenediamine (for example, supplied by Wacker with the commercial name "Geniosil GF91").

The catalyst (if present) constitutes less than 1% by weight of the polymeric binding matrix of the pre-preg.

As already said, the content of fibres and polymeric binding matrix can be varied depending on the characteristics intended to be obtained in the fibre-reinforced composite material according to the invention.

A material with a high fibre content is more suitable for applications requiring elevated mechanical characteristics. Instead, a higher percentage of resin may be more suitable for applications requiring higher operating temperatures or resistance to mechanical wear.

The following two tables 1 and 2 show some formulations of the pre-impregnated fibre-reinforced composite material according to the invention, without organic resins.

TABLE 1

| Formulation 1 | Pitch fibre based pre-preg [wt %] | PAN fibre based pre-preg [wt %] |
|---|---|---|
| Solid resin RSN-0217 (Dow Corning) | 20-40 | 20-40 |
| Silres MSE100 (Wacker) liquid resin | <20 | <20 |
| Divinylbenzene (DVB) | <1 | <1 |
| Fibre content | 40-70 | 40-70 |

TABLE 2

| Formulation 2 | Pitch fibre based pre-preg [% by weight] | PAN fibre based pre-preg [% by weight] |
|---|---|---|
| Solid resin RSN-0217 (Dow Corning) | 20-30 | 25-35 |
| Silres MSE100 (Wacker) liquid resin | 5-15 | 5-15 |
| Divinylbenzene (DVB) | <1 | <1 |
| Fibre content | 55-65 | 50-60 |

The following table 3 shows some formulations of the pre-impregnated fibre-reinforced composite material according to the invention, also comprising at least one organic resin.

TABLE 3

| Formulation 3 | Pitch fibre based pre-preg [% by weight] | PAN fibre based pre-preg [% by weight] |
|---|---|---|
| Solid resin RSN-0217 (Dow Corning) | 20-30 | 25-35 |
| Silres MSE100 (Wacker) liquid resin | 0-5 | 0-5 |
| Norsophen 1203 phenolic resin | 5-10 | 5-10 |
| Divinylbenzene (DVB) | <1 | <1 |
| Fibre content | 55-65 | 50-60 |

One aspect that influences the characteristics of the fibre-reinforced composite material, according to the invention, is the technique of forming the pre-preg, as it influences the final density of the composite thus obtained and consequently the characteristics of mechanical resistance.

Two forming techniques have been evaluated:
Compression moulding;
Vacuum Bagging followed by curing in autoclave.

The different forming techniques typically work at different pressures. A greater pressure allows a greater density of the composite material to be obtained "as cured" (in other words, after forming, before pyrolysis) and consequently superior mechanical characteristics.

In the case of compression moulding, pressures can be applied from about 20 to 80-100 bar; in the case of vacuum bagging (followed by post curing in autoclave), pressures in the order of 2-14 bar can be applied.

Figure 1:
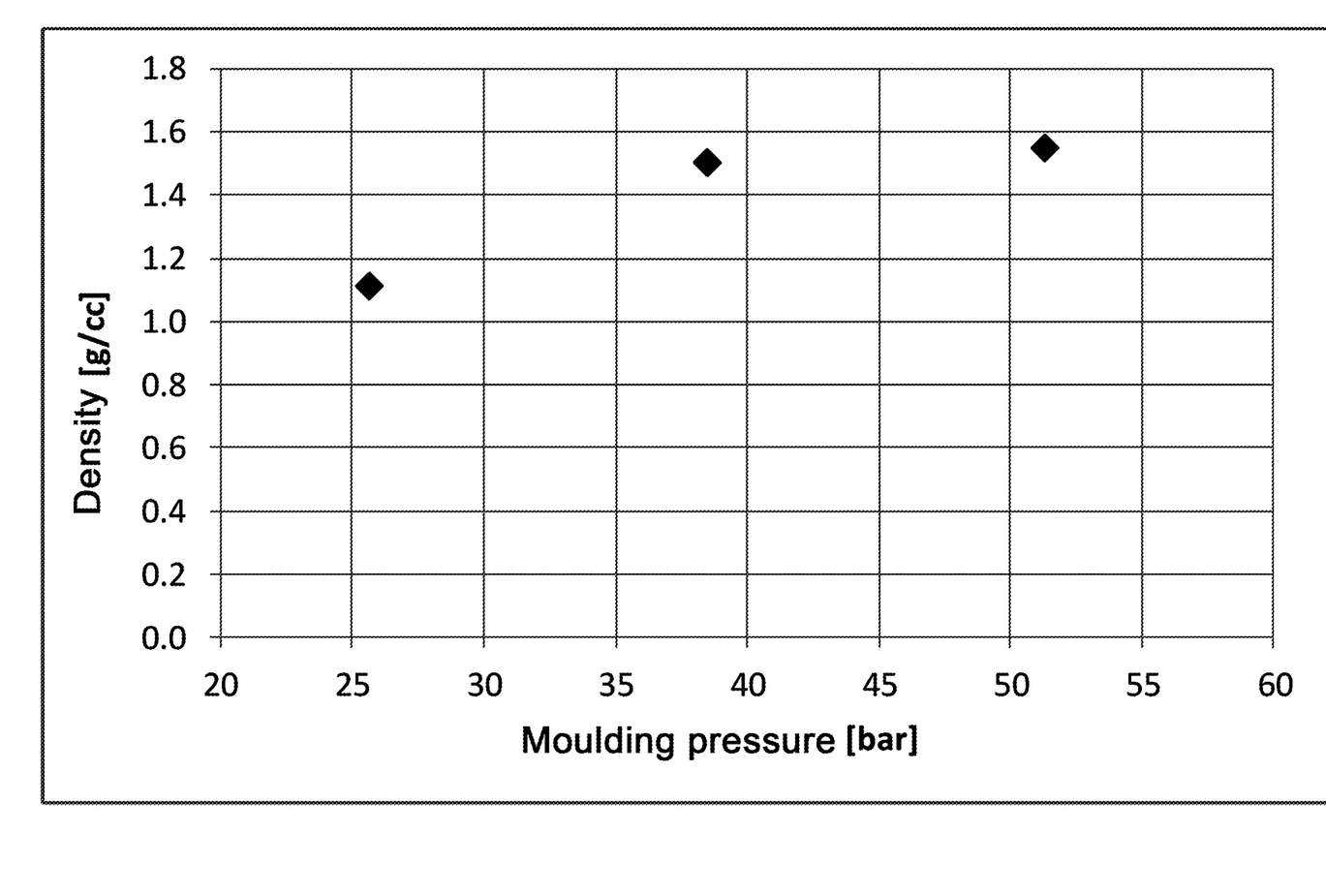
FIG. 1 shows the graph of the trend of the density depending on the moulding pressure of a fibre-reinforced composite material obtained by hot forming (by means of compression moulding) of a pre-preg and from which a fibre-reinforced ceramic composite material was obtained by pyrolysis.

In the case of forming by means of compression moulding, it has been shown how the density of the composite after forming (but before pyrolysis) increases as the moulding pressure increases. The graph in FIG. 1 shows the trend of the density of the fibre-reinforced composite material depending on the moulding pressure, in the case in which the material has been obtained from a pre-preg based on PAN fibres (with characteristics reported in the previous table 2) with forming by compression moulding. The maximum densification of the composite and, consequently, the optimum mechanical characteristics, are obtained above about 50 bar.

It is possible to say that compression moulding is suitable for:
forming composites with superior mechanical characteristics;
producing pieces with a simple, flat shape;
quicker process times.

Instead, vacuum bagging is more suitable for forming pieces with complex shapes, such as, for example braking bands, bells or caliper bodies of disc brakes.

Preferably, the fibre-reinforced ceramic composite material according to the invention is obtained by subjecting the pre-preg to forming by means of the vacuum bagging technique and subsequent heat treatment of curing.

Preferably, the vacuum bagging process is carried out at a pressure from 2 to 14 bar and at a temperature from 180° C. to 300° C. for a period between 60 and 150 minutes.

Alternatively, the fibre-reinforced ceramic composite material according to the invention is obtained by subjecting the pre-preg to hot forming by means of the compression moulding technique.

Preferably, the hot forming by means of the compression moulding technique is carried out with a pressure of not less than 40 bar and at a temperature of not less than 200° C. for a period between 60 and 150 minutes.

It is possible to carry out the forming at temperatures lower than 300° C., preferably at about 180° C., including a subsequent post curing treatment. However, it has been shown experimentally that the best mechanical characteristics are obtained by forming at 300° C.

The technique of vacuum bagging and the technique of compression moulding are both well-known to those skilled in the art and thus will not be described here in detail.

A component of a braking system totally or partially made from a preform according to the invention, and in particular as described previously, forms the subject of the present invention.

Preferably, the aforesaid component is a component of a disc brake, in particular a braking band, a bell or a caliper body.

Preferably, said component of a braking system is obtained by subjecting the aforesaid preform to densification processes, preferably using a technique of Polymer Infiltration Pyrolysis (PIP).

Alternatively, the aforesaid preform (without being subjected to densification processes) can already constitute a braking band, a bell or a caliper body of a disc brake.

The preform (regardless of whether it undergoes densification processes) can also be only a part of a braking band, a part of a bell or a part of a caliper body of a disc brake.

A method for producing a preform made of fibre-reinforced ceramic composite material, in particular according to the present invention and even more in particular as described above, also forms the subject of the present invention.

According to a general form of implementation, such method comprises the following operating steps:
- arranging a pre-preg impregnated with a polymeric binder composition; and
- forming the pre-preg, bringing said polymeric binder composition to at least a partial curing, obtaining a fibre-reinforced composite material;
- subjecting the aforesaid fibre-reinforced composite material to pyrolysis at a temperature from 400° C. to 1,500° C.

According to the invention, the aforesaid pre-preg comprises a fibrous mass impregnated with a polymeric binder composition based on one or more resins selected from the group consisting of siloxane resins and silsesquioxane resins.

As said previously, the expression "based on . . . " means that the resins selected from the group consisting of siloxane resins and silsesquioxane resins constitute at least 70% by weight of the polymeric binder composition.

Optionally, the aforesaid polymeric binder composition can comprise organic resins, preferably epoxy resins, phenolic resins and/or vinyl ester- or cyanate ester-based resins. However, organic resins, if present, constitute no more than 30% by weight of the polymeric binder composition.

Preferably, the aforesaid polymeric binder composition comprises only resins selected from the group consisting of siloxane resins and silsesquioxane resins, and does not comprise organic resins.

Siloxane resins are polymeric resins, which comprise polysiloxanes or which are based on polysiloxanes, whereas siloxane resins are polymeric resins which comprise polysilsesquioxanes or which are based on polysilsesquioxanes.

According to the invention, the polymeric binder composition, with which the fibrous mass of the aforesaid pre-preg is impregnated, appears as a liquid having viscosity from 55000 to 10000 mPas at temperatures from 50° C. to 70° C.

According to the invention, forming leads to the curing of said one or more resins of the polymeric binder composition and, consequently, to the formation of a solid polymeric binding matrix, which develops itself in the interstices of the fibrous mass and is based on polysiloxanes and/or polysilsesquioxanes, cross-linked between one another after cross-linking induced by the curing of the aforesaid one or more resins of the polymeric binder composition.

Preferably, forming is carried out by means of vacuum bagging and subsequent heat treatment of curing.

Preferably, the vacuum bagging process is carried out at a pressure from 2 to 14 bar and at a temperature from 180° C. to 300° C. for a period between 60 and 150 minutes.

Alternatively, forming is carried out hot, using the compression moulding technique.

Preferably, hot-forming using the compression moulding technique, is carried out with a pressure of not less than 40 bar and at a temperature of not less than 200° C. for a period between 60 and 150 minutes.

It is possible to carry out forming at temperatures lower than 200° C., preferably at about 180° C., comprising a subsequent post curing treatment. However, it has been shown experimentally that the best mechanical characteristics are obtained by forming at 300° C.

According to the invention, pyrolysis determines the formation of porosity in the solid polymeric binding matrix due to a partial degradation of the solid polymeric binding matrix and the at least partial transformation of the polysiloxanes and/or the polysilsesquioxanes into silicon carbide and amorphous structures consisting of Si—O—C chains, so as to obtain a fibre-reinforced ceramic composite material from said fibre-reinforced composite material.

The pyrolysis treatment can be carried out in an inert atmosphere, such as, for example, in nitrogen or in argon, or vacuum. Typically, treatments are carried out using rising ramps from 0.2 to 1° C./min. Pyrolysis temperatures are usually from 400 to 1500° C.

Advantageously, the method can comprise a densification step of the fibre-reinforced ceramic composite material. Such densification step is subsequently carried out at the pyrolysis step.

Preferably, the densification step is carried out using the technique of Polymer Infiltration Pyrolysis (PIP).

Alternatively, the densification step can be carried out using liquid silicon infiltration, LSI.

Preferably, the polymeric binder composition constitutes from 25% to 60% by weight of the pre-preg, whereas, the fibrous mass constitutes from 40% to 75% by weight of the pre-preg.

The polymeric binder composition to be used within the scope of the present invention and the method for making the preform in a ceramic composite material according to the invention have already been described in relation to the preform made of a fibre-reinforced ceramic composite material according to the invention. To simplify description, such characteristics are not presented again, but they are also understood to refer to the method according to the invention.

Examples of Application

As said previously, the preform in fibre-reinforced ceramic composite material according to the present invention finds particular application in the production of components designed to operate at elevated temperatures (higher than 400° C.), such as, for example components of disc brakes (such as braking bands, bells, brake calipers) or parts of engines. In particular, the preform according to the invention is designed to undergo processes of densification for making, in particular, components of disc brakes or parts of engines.

It was possible to verify experimentally that the fibre-reinforced ceramic composite material, with which the preform is made according to the invention, obtained by forming and pyrolysis of a pre-preg which does not contain, or at least which does not contain only organic resins, but which is impregnated with one or more siloxane resins and/or silsesquioxane resins, has silicon carbide and inorganic amorphous structures consisting of Si—O—C chains, which are such that they make it suitable for making preforms for densification processes, and it is characterised by elevated thermal conductivity and increased hardness so as to ensure greater resistance to abrasion.

Fibre-reinforced ceramic composite materials made according to the invention underwent testing, starting from pre-pregs impregnated with two different formulations of the polymeric binder composition without organic resins. The two formulations essentially differ in that one formulation is made with carbon fibres from pitch and the other formulation is made with carbon fibres from polyacrylonitrile (PAN).

The same resins were used in both formulations, varying the weight ratios so as to keep the volume ratios between resins and fibres constant. This was made necessary because the different types of fibres have different densities.

The two formulations correspond to the two formulations reported in the previous Table 2.

More specifically, a mixture of two siloxane resins was used as the polymeric binder composition, one solid at room temperature and one liquid at room temperature. The weight ratio between solid resin and liquid resin is from 100/30 to 100/50.

Resin RSN-0217 (marketed by Dow Corning) was used as solid resin; it is a phenyl siloxane resin, solid at room temperature, with a melting point of about 80° C.

Resin Silres MSE100 (marketed by Wacker) was used as liquid resin; it is a methyl methoxy siloxane resin, liquid at room temperature, characterised by low viscosity, about 25-40 mPa·s at room temperature.

The solid resin is soluble in the liquid resin and a solution with weight ratios from 100/30 to 100/50 respectively between solid and liquid presents optimum properties for producing pre-pregs. In particular, the mixture of the two resins has a sticky semi-solid appearance at room temperature, while at 50-70° C. it is a liquid with high viscosity (from 55,000 to 10,000 mPa·s), the best characteristic for impregnating a fabric.

The carbon fibres were used in the form of unidirectional laminate, in other words, consisting of fibres oriented along a single direction.

The fibre laminate (Pitch or PAN fibres) was impregnated with the polymeric binder composition at a temperature from 70 to 75° C., obtaining the pre-preg.

The pre-preg thus obtained subsequently underwent hot-forming, inducing curing (cross-linking) of the resins, obtaining a fibre-reinforced composite material.

In particular, hot forming was carried out using the compression moulding technique. Tests were carried out at two different pressures: 51 bar and 26 bar. Forming was carried out at 300° C. for a minimum time period of 150 minutes, without conducting a step of post-curing.

The samples of fibre-reinforced composite material according to the invention, obtained from the formulation with pitch fibres (in the form of unidirectional laminate), after forming (with compression moulding at 50 bar) and complete cross-linking of the resins, underwent pyrolysis and densification by means of PIP process (Polymer Infiltration Pyrolysis; 3 cycles).

The pyrolysis treatments were carried out at 1500° C. under vacuum. Densification was performed using a liquid siloxane resin. The impregnation process was carried out at room temperature, at a vacuum level of about 40 mbar.

The samples were characterised under the profile of thermal conductivity and mechanical resistance characteristics.

Table 4 shows the thermal conductivity values of a sample of fibre-reinforced ceramic composite material, after pyrolysis and densification by means of PIP process (3 cycles). Characterisation was carried out using the Laserflash technique, according to standard ASTM E-1461, in an orthogonal direction to the planes of the pre-preg and at 400° C.

TABLE 4

| Preform | Composite density [g/cm$^3$] | Specific heat [J/(g · K)] Average | Thermal diffusivity [mm$^2$/s] Average | St. Dev. | Thermal conductivity [W/(m · ° K)] Average | St. Dev. |
|---|---|---|---|---|---|---|
| Laminated UD pitch | 1.83 | 1.68 | 1.38 | 0.01 | 4.25 | 0.02 |

The level of conductivity of the composite higher than 4 W/(m·° K) derives from the conductivity of the matrix, which was partially crystalised in silicon carbide.

Table 5 shows the values of some properties of mechanical resistance of the same composite for which the thermal characterisation was carried out. Characterisation was carried out with a bending test at 3 points according to the standard ASTM-C1341, testing the composite with fibre orientation at 0°. The measurement was taken on only one sample.

TABLE 5

| Preform | MOR [MPa] Average | Std. Dev. | MOE [GPa] Average | Std. Dev. | Deformation at break [%] Average | Std. Dev. |
|---|---|---|---|---|---|---|
| UD pitch | 342 | — | 175 | — | 0.21 | — |

The test confirmed that the fibre-reinforced ceramic composite material according to the present invention—after forming and subsequent pyrolysis and densification, can result in the production of components designed to operate at elevated temperatures (higher than 400° C.), such as, for example, components of disc brakes (such as braking bands, bells, brake calipers) or parts of engines.

Due to the fact that the polymeric binder composition is based on siloxane resins and/or silsesquioxane resins, after pyrolysis from 400 to 1,500° C., the composite material has silicon carbide and amorphous structures consisting of Si—O—C chains, which ensure operating temperatures of up to 1000° C. (variable depending on the densification processes). The formation, at least in part, of silicon carbide after pyrolysis treatments at temperatures of up to 1500° C., gives the composite properties of technological interest, such as: elevated hardness, high modulus of elasticity, high thermal stability, high thermal conductivity.

In particular, it is worth noting the high thermal conductivity, which is far greater than 1 W/(m·° K).

The mechanical resistance values are average. In particular, it is worth noting the stress at break (MOR), which reaches values of about 300-350 MPa (value influenced by various factors, including fibres and types and levels of densification).

Finally, the presence in the matrix of silicon carbide ensures a good resistance to wear by abrasion.

The invention thus conceived consequently achieves the intended objects.

Clearly, in the practical implementation thereof, it may also assume different forms and configurations from that illustrated above, without going beyond the protective scope.

Furthermore, all details can be replaced by technically equivalent components and any size, shape and material can be used according to needs.

The invention claimed is:

1. A preform for making a component of a braking system, consisting of a fibre-reinforced ceramic composite material, obtained by forming and subsequent pyrolysis of a pre-preg, wherein said pre-preg consists of a fibrous mass impregnated with a polymeric binder composition based on one or more resins selected from the group consisting of siloxane resins and silsesquioxane resins and may optionally comprise one or more organic resins, said siloxane resins comprising polysiloxanes and said silsesquioxane resins comprising polysilsesquioxanes, wherein said polymeric binder composition appears as a liquid having viscosity of between 55000 and 10000 mPas at temperatures of between 50° C. and 70° C., wherein said fibre-reinforced ceramic composite material comprises a ceramic or partially ceramic matrix, which develops itself in the interstices of the fibrous mass and comprises silicon carbide and amorphous structures consisting of Si—O—C chains, said silicon carbide and said Si—O—C chains having been generated by a pyrolysis process on said polysiloxanes and/or said polysilsesquioxanes, said fibre-reinforced ceramic composite material having a porosity generated by the pyrolysis on the polymeric binder composition of the pre-preg,
wherein said polymeric binder composition further comprises at least one solvent, selected from the compounds able to solubilize siloxane resins and silsesquioxane resins, said solvent being divinylbenzene, said solvent constituting less than 1% by weight of said pre-preg,
said braking system component being obtained by subjecting said preform to densification processes, using the Polymer Infiltration Pyrolysis (PIP) technique, said component being a component of a disc brake, including a braking band, a bell or a brake caliper body.

2. The preform according to claim 1, wherein said polymeric binder composition only comprises resins selected from the group consisting of siloxane resins and silsesquioxane resins.

3. The preform according to claim 1, wherein said ceramic or partially ceramic matrix constitutes from 15% to 70% by weight of said fibre-reinforced composite ceramic material and wherein said fibrous mass constitutes from 30% to 85% by weight of said fibre-reinforced composite ceramic material.

4. The preform according to claim 1, wherein said ceramic or partially ceramic matrix comprises a thermoconductive inert filler in the form of powder, selected from the group consisting of boron nitride or crystallinity graphites or metals or a combination thereof, said inert filler constituting from 10% to 30% by volume of said fibre-reinforced composite ceramic material.

5. The preform according to claim 1, wherein said fibrous mass consists of fibres selected from the group consisting of carbon fibres, glass fibres, ceramic fibres or mixtures thereof, wherein the carbon fibres are carbon fibres from polyacrylonitrile (PAN) and/or carbon fibres from pitch, wherein the glass or ceramic fibres consists of alumina, zirconia or silicon carbide.

6. The preform according to claim 1, wherein said polymeric binder composition with which said pre-preg is impregnated comprises a mixture of:
at least one resin selected from the group consisting of siloxane resins and silsesquioxane resins, solid at room temperature, with a melting point range of between 40 and 90° C.; and
at least one resin selected from the group consisting of siloxane resins and silsesquioxane resins, liquid at room temperature, with a viscosity at room temperatures of between 1 mPa·s and 5000 mPa·s;
the weight ratio between solid resin at room temperature and liquid resin at room temperature is of between 100/30 and 100/50.

7. The preform according to claim 6, wherein the solid resin at room temperature is selected from the group consisting of phenyl siloxane resin, methyl siloxane resin, phenyl methyl silsesquioxane resin, methyl silsesquioxane resin, and wherein said liquid resin at room temperature is selected from the group consisting of methyl methoxy siloxane resin and methyl phenyl vinyl siloxane resin.

8. The preform according to claim 1, wherein said polymeric binder composition comprises a mixture of:
a single resin selected from the group consisting of siloxane resins and silsesquioxane resins, liquid at room temperature, with a viscosity at room temperatures of between 1 and 5000 mPa·s; and
an inert filler in powder,
the volume ratio of inert filler to liquid polymer at room temperature is of between 10/100 and 40/100.

9. The preform according to claim 1, wherein said polymeric binder composition further comprises at least one catalyst suitable to promote the cross-linking of said one or more resins of the polymeric binder composition at temperatures higher than 100° C. during the forming step, said catalyst being selected from the group consisting of titanates, metal octoates and amines, and said catalyst being selected from the group consisting of titanium tetrabutanolate, zinc octoate and N-3-(trimethoxysilyl)propyl)ethylenediamine, said catalyst consisting of less than 1% by weight of said polymeric binder composition.

10. The preform according to claim 1, wherein said forming is carried out by vacuum bagging and subsequent heat treatment of curing, said vacuum bagging being carried at a pressure of between 2 and 14 bar and a temperature of between 180° C. and 300° C. for a period of between 60 and 150 minutes.

11. The preform according to claim 1, wherein said forming is carried out hot by compression moulding, at a pressure no lower than 40 bar and at a temperature not lower than 200° C. for a time period of between 60 and 150 minutes.

12. A method for making a preform of a fibre-reinforced composite ceramic material, comprising the following operating steps:
arranging a pre-preg impregnated with a polymeric binder composition; and
forming said pre-preg bringing said polymeric binder composition to at least a partial curing, obtaining a fibre-reinforced composite material;
subjecting said fibre-reinforced composite material to pyrolysis at a temperature of between 400° C. and 1,500° C., so as to obtain said preform
wherein said pre-preg comprises a fibrous mass impregnated with a polymeric binder composition based on one or more resins selected from the group consisting of siloxane resins and silsesquioxane resins and may optionally comprise one or more organic resins, said siloxane resins comprising polysiloxanes and said silsesquioxane resins comprising polysilsesquioxanes, wherein said polymeric binder composition appears as a liquid, having a viscosity of between 55000 and 10000 mPas at a temperature of between 50° C. and 70° C., wherein said forming leads to the curing of said one or more resins of the polymeric binder composition, and thus to the formation of a solid polymeric binder matrix, which develops itself in the interstices of the fibrous mass and is based on polysiloxanes and/or polysilsesquioxanes, cross-linked with each other as a result of the cross-linking induced by the curing of said one or more resins of the polymeric binder composition, and wherein said pyrolysis causes the formation of porosity in said solid polymeric binder matrix due to a partial degradation of the solid polymeric binder matrix and the at least partial transformation of said polysiloxanes and/or polysilsesquioxanes into silicon carbide and amorphous structures consisting of Si—O—C chains, so as to obtain a fibre-reinforced ceramic composite material from said fibre-reinforced composite material.

13. The method according to claim 12, wherein said polymeric binder composition only comprises resins selected from the group consisting of siloxane resins and silsesquioxane resins.

14. The method according to claim 12, wherein said polymeric binder composition constitutes from 25% to 60% by weight of said pre-preg and wherein said fibrous mass constitutes from 40% to 75% by weight of said pre-preg.

15. The method according to claim 12, wherein said polymeric binder composition comprises a mixture of at least one resin selected from the group consisting of siloxane resins and silsesquioxane resins, solid at room temperature, with a melting point not lower than 50° C.; and at least one resin selected from the group consisting of siloxane resins and silsesquioxane resins, liquid at room temperature, with a viscosity at room temperatures of between 1 mPa·s and 1500 mPa·s;

the weight ratio between solid resin at room temperature and liquid resin at room temperature is of between 100/30 and 100/50.

16. The method according to claim 15, wherein the solid resin at room temperature is selected from the group consisting of phenyl siloxane resin, methyl siloxane resin, phenyl methyl silsesquioxane resin, methyl silsesquioxane resin, and wherein said liquid resin at room temperature is selected from the group consisting of methyl methoxy siloxane resin and methyl phenyl vinyl siloxane resin.

17. The method according to claim 12, wherein said polymeric binder composition comprises a mixture of:

a single resin selected from the group consisting of siloxane resins and silsesquioxane resins, liquid at room temperature, with a viscosity at room temperatures of between 1 and 5000 mPa·s; and an inert filler in powder, the volume ratio of inert filler to liquid polymer at room temperature is of between 10/100 and 40/100.

18. The method according to claim 12, wherein said polymeric binder composition further comprises at least one solvent, selected from the compounds able to solubilize siloxane resins and silsesquioxane resins, said solvent being divinylbenzene, said solvent constituting less than 1% by weight of said pre-preg.

19. The method according to claim 12, wherein said polymeric binder composition comprises at least one catalyst suitable to promote the cross-linking of said one or more resins of the polymeric binder composition at temperatures higher than 100° C., said catalyst being selected from the group consisting of titanates, metal octoates and amines, and said catalyst being selected from the group consisting of titanium tetrabutanolate, zinc octoate and N-3-(trimethoxysilyl)propyl) ethylenediamine, said catalyst consisting of less than 1% by weight of said polymeric binder composition.

20. The method according to claim 12, wherein said polymeric binder composition comprises a thermoconductive inert filler in the form of powder selected from the group consisting of boron nitride or crystallinity graphites or metals or a combination thereof, said inert filler constituting from 10% to 30% by volume of said pre-preg.

21. The method according to claim 12, wherein said fibrous mass consists of fibres selected from the group consisting of carbon fibres, glass fibres, ceramic fibres or mixtures thereof, the carbon fibres being carbon fibres from polyacrylonitrile (PAN) and/or carbon fibres from pitch, the glass or ceramic fibres consisting of alumina, zirconia or silicon carbide.

22. The method according to claim 12, wherein said forming is carried out by vacuum bagging and subsequent heat treatment of curing, said vacuum bagging being carried out at a pressure of between 2 and 14 bar and at a temperature from 180° C. to 300° C. for a period of between 60 and 150 minutes.

23. The method according to claim 12, wherein said forming is carried out by hot compression moulding at a pressure no lower than 40 bar and at a temperature not lower than 200° C. for a time period between 60 and 150 minutes.

24. The method according to claim 12, comprising a densification step of said fibre-reinforced ceramic composite material carried out after said pyrolysis step, said densification step being carried out using the Polymer Infiltration Pyrolysis (PIP) technique.

* * * * *